Nov. 12, 1940.    D. E. DASHER    2,221,633
THERMOSTATIC APPARATUS
Filed May 28, 1938
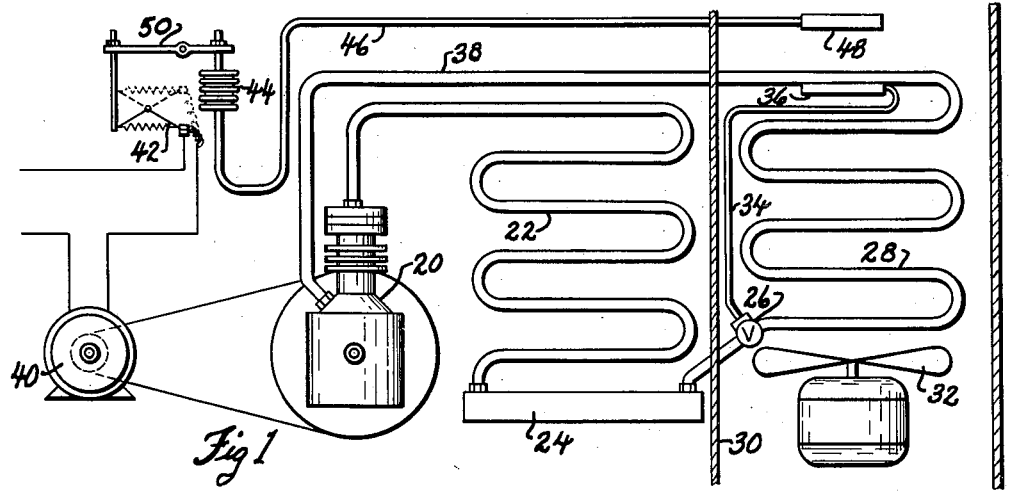
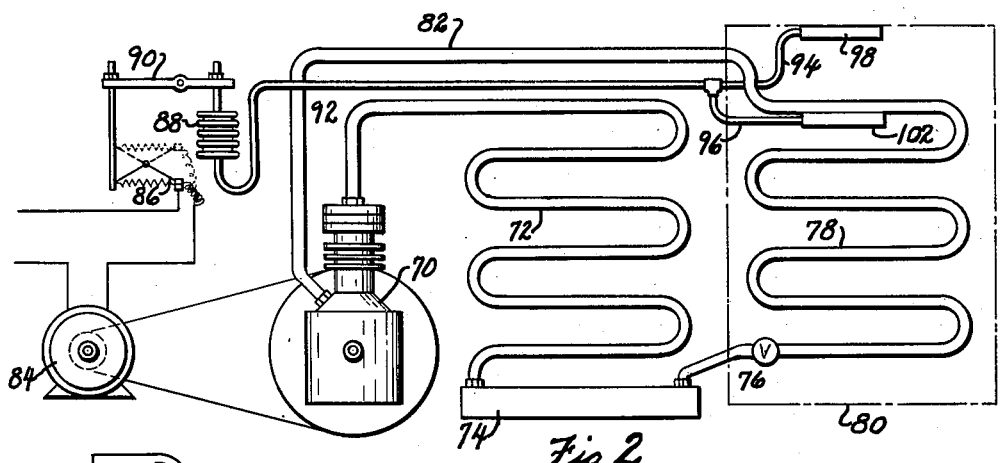
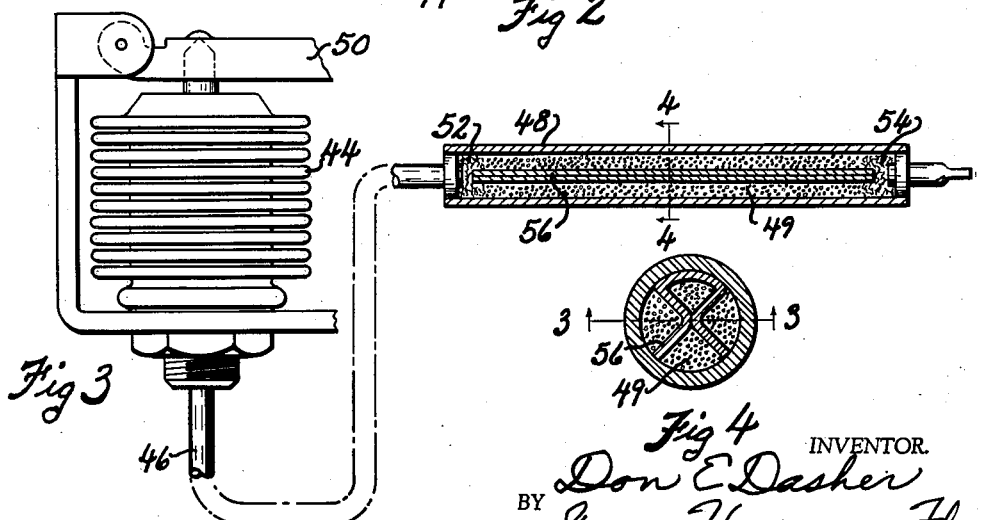
INVENTOR.
Don E. Dasher
BY Spencer Hardman and
ATTORNEYS Patented Nov. 12, 1940

2,221,633

UNITED STATES PATENT OFFICE 2,221,633

THERMOSTATIC APPARATUS

Don E. Dasher, Dayton, Ohio, assignor to General Motors Corporation, Dayton, Ohio, a corporation of Delaware Application May 28, 1938, Serial No. 210,725

1 Claim. (Cl. 297—5)

This invention relates to refrigerating apparatus and more particularly to temperature responsive control means for refrigerating apparatus and all sorts of other apparatus which is controlled in whole or in part by temperature.

Temperature responsive means usually comprise a bellows and bulb assembly charged with a volatile liquid. Such a system is limited in its operation to the characteristics of the volatile liquid used in its saturated and superheated state. An assembly so charged also has the characteristic that the pressure within the assembly is ordinarily controlled by the temperature at its coldest point.

It is an object of my invention to provide a temperature responsive means which pressure temperature relation is not limited to the characteristics of the volatile liquid or gas used, but which may be changed by its design to provide almost any desired characteristic.

It is another object of my invention to provide a temperature responsive means in which the temperature of the bulb always controls the pressure temperature relation within the bellows and bulb assembly.

It is still another object of my invention to provide a temperature responsive means having two thermostat bulbs connected to a single bellows in which the pressure and the bellows and bulb assembly will reflect the temperature of both bulbs in substantially any desired proportion.

It is another object of my invention to provide a temperature responsive means charged with a gas and an adsorbent for the gas.

It is a further object of my invention to provide a temperature responsive means which will operate upon gas pressure over a wide range of temperature.

Further objects and advantages of the present invention will be apparent from the following description, reference being had to the accompanying drawing, wherein a preferred form of the present invention is clearly shown.

In the drawing:

Fig. 1 is a view partly diagrammatic of a refrigerating system showing two forms of my improved temperature responsive means incorporated as the controls thereof;

Fig. 2 shows a refrigerating system, partly diagrammatic, illustrating a modified form of my invention applied as a control therefor;

Fig. 3 is a showing, partly diagrammatic, of a bellows and bulb assembly of one of the temperature responsive means of Fig. 1 disclosing my invention and showing a section of the thermostat bulb taken along the line 3—3 of Fig. 4; and Fig. 4 shows a section of the thermostat bulb taken along the line 4—4 of Fig. 3.

Briefly, I have shown in Fig. 1 a compression type of refrigerating system such as is used in an air conditioning system, having a thermostatically controlled expansion valve which is charged with a gas and which has its thermostat bulb charged with an adsorbent for the gas, such as activated charcoal, activated silica, or activated alumina. The operation of the electric motor which drives the compressor is also controlled by the thermostatic switch having a bellows and bulb assembly charged with a gas and in which a thermostat bulb is located in the air stream and is charged with an adsorbent for the gas, such as activated charcoal, activated silica, or activated alumina. In each case the change in temperature of the thermostat bulb causes the adsorption or evolution of the gas by the adsorbent of the bulb to lower or raise the pressure in the bulb assembly to operate the expansion valve and the switch which controls the operation of the electric motor which drives the compressor.

In Fig. 2 the refrigerating system is provided with an automatic expansion valve and the electric motor which drives the compressor is provided with a thermostatic switch having a bellows connected by tubing to two thermostat bulbs, one of which is in contact with the evaporating means while the other is located in the upper part of the compartment to be cooled. The bellows and bulb assembly are charged with a gas which can be adsorbed by some suitable adsorbent. The thermostat bulbs are charged with an adsorbent for the gas, such as activated charcoal, activated silica or activated alumina.

Fig. 3 shows an enlarged view of the bellows and bulb assembly, which bellows is arranged to operate any instrument such as a valve, a switch, an indicator or a damper. The bellows and bulb assembly is preferably charged with some suitable gas, such as difluorodichloromethane or dimethyl ether. The thermostat bulb contains rock wool, steel wool, glass wool or felt at both ends between which is provided the activated charcoal which may be mixed, if desired, with copper or alumina powder to increase its thermal conductivity. Also to increase the thermal conductivity a sheet brass spring is provided within the thermostat bulb in the portion containing the charcoal so as to act as an internal fin for the thermostat bulb.

Referring now to the drawing and more particularly to Fig. 1, there is shown a compressor 20 for compressing the refrigerant and for forwarding the compressed refrigerant to a condenser 22 where the compressed refrigerant is liquefied and collected in the receiver 24. From the receiver 24 the liquid refrigerant is conducted under the control of the thermostatic automatic expansion valve 26 to an evaporating means 28 located within the air stream passing through the duct 30 under the influence of an electric motor-driven fan 32. This air stream is cooled by the evaporating means and may be used to cool a room or a storage cabinet. The compressor and condenser are isolated from the room or the storage cabinet to prevent them from giving heat to the room or cabinet which is to be cooled.

The automatic thermostatic valve 26 has a diaphragm responsive to a pressure of the refrigerant within the evaporating means 28 and a second bellows or diaphragm which is connected by tubing 34 to thermostat bulb 36 located upon the outlet of the evaporating means 28. The bellows and bulb assembly is preferably charged with dimethyl ether and the thermostat bulb 36 is preferably charged with activated charcoal and provided with a sheet brass spring fin member acting as an internal fin, as shown in Figs. 3 and 4. It is also preferably provided with rock wool at both ends of the bulb as shown in Fig. 3. The temperature of the thermostat bulb 36 varies in accordance with the temperature of the liquid and gas issuing from the evaporating means 28. When all the gas is evaporated and becomes saturated it heats the charcoal within the thermostat bulb causing the evolution of gas from the charcoal to raise the pressure within the bellows, bulb and tube assembly to cause the valve 26 to be opened wider to admit more refrigerant to the evaporating means 28. When an adequate supply of liquid refrigerant is supplied to the evaporating means 28 the thermostat bulb 36 will be cooled causing the charcoal to adsorb some of the gas in the bellows, bulb and tube assembly thus lowering the pressure therein and causing the valve 26 to move toward the closed position in order to decrease the supply of liquid refrigerant to the evaporating means.

The refrigerant evaporated within the evaporating means 28 is returned to the compressor through the return conduit 38. The compressor 20 is driven by an electric motor 40 under the control of a snap acting switch means 42 which is operated by a metal bellow 44 through a lever 50 and snap acting mechanism. The interior of the metal bellows 44 is connected by tubing 46 to a thermostat bulb 48 located in the air stream within the duct 30 or at any suitable point which properly reflects the temperature of the room or cabinet to be cooled. The bellows, bulb and tubing assembly is preferably charged with difluorodichloromethane and the thermostat bulb 48 is preferably charged with activated charcoal 49 as shown in Fig. 3. However, other gases and adsorbents may be used such as activated silica or activated alumina.

Referring now to Fig. 3 for an enlarged view of the bellows, bulb and tubing assembly, the bellows 44 is shown as operating a lever 50 which may be employed to operate a snap acting switch mechanism or a valve, or a damper, or any sort of an instrument. As shown the thermostat bulb 48 is provided with a wad of rock wool 52 and 54 at either end of the bulb to prevent migration of the adsorbent which is preferably activated charcoal which may be mixed with copper or alumina powder, if desired, in order to increase the conductivity of the activated charcoal. In order to further increase the conductivity within the thermostat bulb 48 a spring brass member 56 may be provided in the section containing the charcoal so as to increase the rapidity of the heat flow between the walls of the thermostat bulb and the activated charcoal. Instead of this means longer bulbs of smaller diameter may be used in order to increase the rapidity of heat conduction between the walls of the bulb and the charcoal.

The relation between the amount of charcoal and the volume of the bellows and the connecting tubing is of considerable importance. The quality of the activated charcoal is also important. Up to a certain limit the greater the quantity and the higher the quality of the charcoal in proportion to the volume of the tubing and the bellows, the greater will be the change in pressure caused by the change in temperature of the thermostat bulb 56. That is, the greater the quantity of charcoal and the higher the quality, the steeper the pressure temperature curve will be when pressures are plotted upon the vertical axis and temperatures are plotted upon horizontal axis.

The charging pressure of the gas is also important. The bellows, bulb and tube assembly should be charged with an amount of gas that is greater than can be completely adsorbed by the charcoal. Also the assembly should not be charged to such a pressure that the gas will condense under operating conditions. Between these limits the charging pressure may be varied in order to change the operating characteristics of the assembly. In general, the increase in charging pressure will raise the pressures without materially changing the slope of the pressure and temperature curve.

Thus with these conditions kept in mind for different applications almost any gas which is adsorbed by an adsorbent may be used and almost any adsorbent which can adsorb a gas may be used. With charcoal as the adsorbent, almost any of the gaseous or volatile hydrocarbons and their derivatives, such as the halofluoro derivatives of the aliphatic hydrocarbons may be used as well as almost any of the refrigerants and even relatively inert gases, such as carbon dioxide or nitrogen. Other adsorbents which may be used are activated silica, sometimes known by the trade name "Silica gel" and also activated alumina with which water vapor can be used.

With this form of temperature responsive control which employs the adsorption of a gas almost any desired operating characteristics can be obtained by the selection of the gas and the adsorbent by varying the charging pressure and temperature of the gas and by varying the quality and amount of adsorbent in proportion to the volume of the bellows and connecting tubing. Thus it is possible to obtain characteristics heretofore unobtainable by volatile liquids and the thermal expansion of non-volatile liquids which have been used for operating various forms of controls and instruments.

By the use of this improved form of control the thermostat bulb always is the controlling factor of the bellows, bulb and tube assembly regardless of whether the bulb is the coldest portion of the assembly or not. Heretofore considerable difficulties have been encountered where other portions of the bellows, bulb and tube assembly were colder than the bulb itself so that the temperature of the bulb was not the controlling temperature of an assembly. This often happens in case of thermostatically controlled expansion valves in refrigerating systems in which the bellows which operate the valve often are colder than the bulb itself, so that condensation often takes place at the bellows and the temperature of the bellows determines the pressure within the bellows, bulb and tube assembly and thereby controls the operation of the valve rather than the bulb. This difficulty is overcome by my improved system in which the refrigerant is so selected and is charged at a sufficiently low pressure that condensation will not take place at any point in the assembly under normal operating conditions.

My improved form of control also has a feature that may be used to operate ordinary pressure operated switches under conditions at which the bulb is required to be subject to comparatively high temperatures. Under such conditions charcoal may be used up to certain temperatures and above such temperatures activated silica and activated alumina may be used in the thermostat bulb. The system may be charged with a gas which may be used with the same bellows and switch as is used for a refrigerating system wherein the bulb operates at much lower temperatures. Thus with such an arrangement one switch can be used for widely different control conditions. This feature is also applicable to valves, dampers and the control of instruments.

Because of the fact that no condensation takes place within the bellows, bulb and tube assembly more than one thermostat bulb may be connected to a single bellows to operate either a switch, a valve, a damper or an instrument. The proportional effect of each of the bulbs upon the pressure within the system may be controlled by the quality and/or amount of adsorbent provided in each of the bulbs or by the use of different adsorbents. For example, the bulbs may be subject to wide variations in temperature and the effect of each bulb may be controlled by its size which, of course, governs the amount of adsorbent which it can contain. By changing the conductivity of the charcoal in the bulb by the use of metal powder as suggested above, or by the use of some form of fins, or by using different diameters of thermostat bulbs, the sensitivity of the two bulbs may be made different.

The control provided with two thermostat bulbs connected to a single bellows is illustrated in Fig. 2. In Fig. 2 there is shown the compressor 70 for compressing a refrigerant and for forwarding the compressed refrigerant to a condenser 72 where the refrigerant is condensed and collected in a receiver 74. From the receiver 74 the liquid refrigerant is forwarded under the control of an automatic expansion valve 76 to an evaporating means 78 located within the compartment 80 which may be the food storage compartment of a household refrigerator while the evaporating means 78 may have provisions for freezing ice in ice trays. The evaporating means removes heat from the air in the storage compartment 80 as well as from any ice trays with which it may be provided, causing the refrigerant to evaporate and this evaporated refrigerant is returned to the compressor through the return conduit 82.

The compressor 70 is driven by an electric motor 84 under the control of a snap acting switch means 86 which is operated by the bellows 88 through a lever 90. The interior of the bellows 88 is connected by the tube 92 and the branch tubes 94 and 96 to thermostat bulbs 98 and 102. The thermostat bulb 102 is preferably located in heat exchange relation with the evaporating means 78 while the thermostat bulb 98 is prefererably located in the upper portion of the storage compartment where it is sensitive to the average temperature and particularly sensitive to the maximum temperature of the air medium within the storage compartment 80. The thermostat bulbs 98 are preferably charged with activated charcoal and provided with wadding as shown in Fig. 3. If desired they may be provided with internal fins and/or metal powder to increase their sensitivity. If desired the bulb 102 may be charged with a higher quality of activated charcoal or may be charged with a larger amount of activated charcoal than the bulb 98 since the bulb 102 will normally operated at a lower temperature than the bulb 98. However, if it is desired to give greater control to the bulb 98 then the bulbs might be charged identically, thus through this means either bulb may be so charged as to give it greater control than the other and in almost any desired proportion. The bellows, bulb and tube assembly may be charged with any suitable gas that can be adsorbed by charcoal, such as difluorodichloromethane. However, many other gases and other adsorbents, such as activated silica and alumina may be used.

With a control such as this, if the evaporator temperature should remain at the normal temperature desired for it, an excessive heat load will be placed in the storage compartment 80 then the bulb 98 would rapidly warm up and cause the refrigerating system to operate and to bring the temperature of the evaporating means below normal to accommodate the heavy heat load placed in the storage compartment. The bulb 98 will also accommodate for changes in outside temperature which tend to raise the temperature within the storage compartment 80 even though the evaporating means remains at the same temperature. Under such conditions bulb 98 will operate to keep the evaporating means at a temperature below normal when the temperature within the storage compartment 80 tends to rise above normal and tends to keep the evaporator temperature above normal or when the temperature of the storage compartment 82 tends to go below normal.

While the form of embodiment of the present invention as herein disclosed constitutes a preferred form, it is to be understood that other forms might be adopted, all coming within the scope of the claim which follows.

What is claimed is as follows:

A control apparatus including enclosing wall means forming a closed chamber, said enclosing wall means including diaphragm means, a plurality of bulbs and connecting tubing; a device operably connected to and operated by said diaphragm means, said enclosing wall means containing a gas, the pressure of said gas being sufficiently low to prevent the formation of free liquid by condensation at all points within the enclosing wall means under all operating conditions, a plurality of said bulbs containing an adsorbent capable of adsorbing and evolving some of said gas upon changes in temperature to lower and raise the gas pressure within the chamber to operate the diaphragm means, the amount and quality of the adsorbent in each of the bulbs as well as the gas pressure being correlated to provide the desired proportional effect of each bulb upon the diaphragm.

DON E. DASHER.